United States Patent [19]

Shepard et al.

[11] 4,004,392
[45] Jan. 25, 1977

[54] MOLDED PLASTIC KEY MOLDED JOINT AND METHOD OF FORMING SAME

[75] Inventors: Robert W. Shepard, La Mesa; George R. Heffner, University City, both of Calif.

[73] Assignee: Rohr Industries, Inc., Chula Vista, Calif.

[22] Filed: June 2, 1975

[21] Appl. No.: 582,596

[52] U.S. Cl. .................................. 52/436; 29/460; 52/743; 264/261; 264/263; 403/267; 403/364; 52/588

[51] Int. Cl.² ....................... E04C 1/10; E04C 1/30

[58] Field of Search ........... 29/460; 52/588, 758 D; 264/261, 263; 403/364, 269

[56] References Cited
UNITED STATES PATENTS

| | | | |
|---|---|---|---|
| 2,295,874 | 9/1942 | Stone et al. .................. | 29/460 UX |
| 2,686,091 | 8/1954 | Young .......................... | 29/460 UX |
| 3,133,344 | 5/1964 | Keasler .................. | 29/DIG. 23 UX |
| 3,156,210 | 11/1964 | Lyon .......................... | 52/758 D X |
| 3,590,545 | 7/1971 | Webb .................................. | 52/588 |

*Primary Examiner*—Charlie T. Moon
*Attorney, Agent, or Firm*—Patrick J. Schlesinger

[57] ABSTRACT

In a plastic key joint wherein edge portions of two adjacent strakes are in relatively superposed, interfitted, edgewise engagement with each other in a manner to define a fully enclosed keyway therebetween, the present invention resides in deforming, preferably in an undulating or sine wave pattern, laterally opposite sides of the keyway prior to injecting, under selected pressure, flowable, hardenable key material into the keyway, thereby greatly increasing resistance of the joint to longitudinal shear stresses.

6 Claims, 6 Drawing Figures

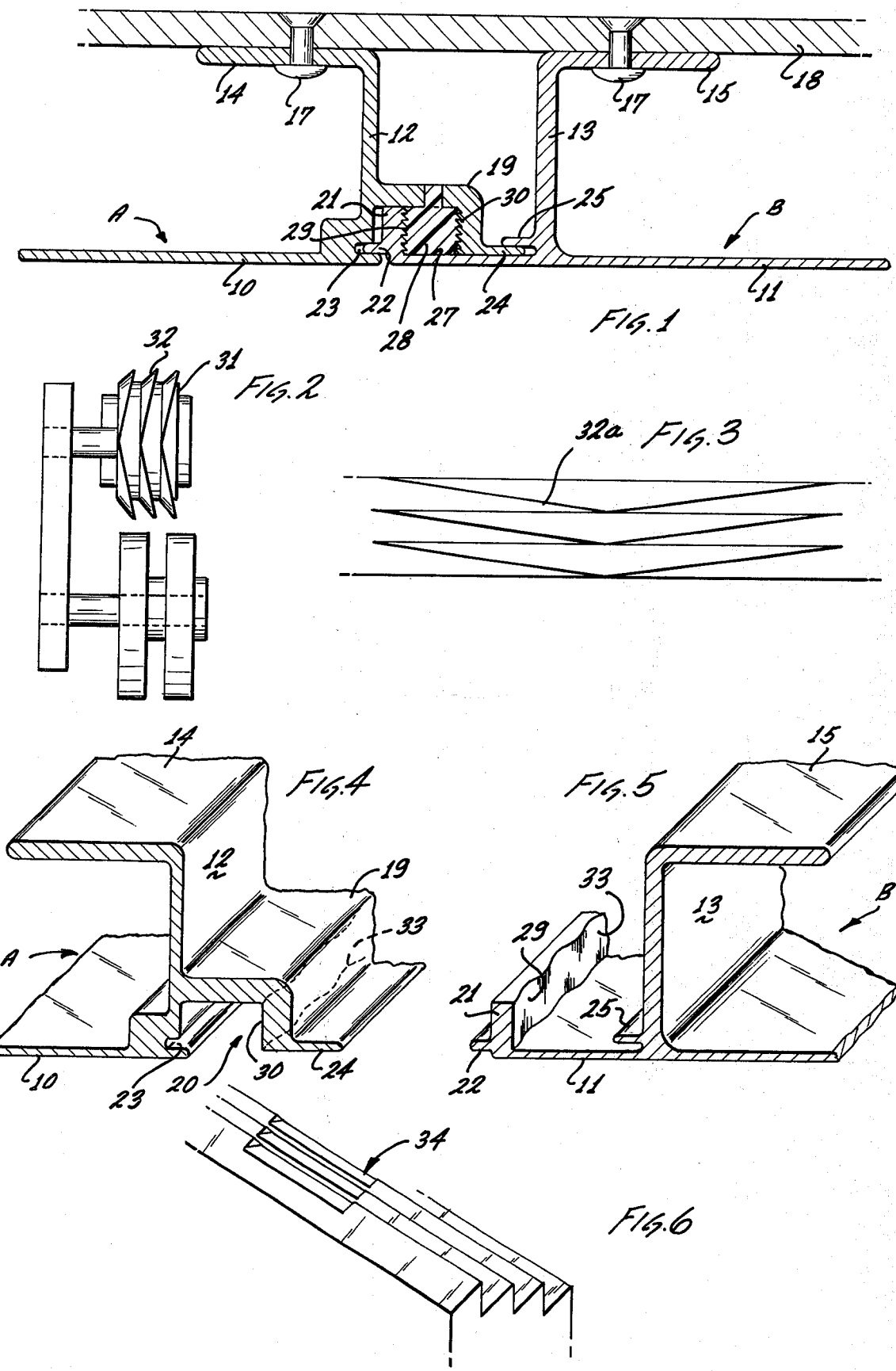

MOLDED PLASTIC KEY MOLDED JOINT AND METHOD OF FORMING SAME

BACKGROUND OF THE INVENTION

In Patent Application Ser. No. 453,378, now abandoned, filed Mar. 21, 1974, by Keith W. Tantlinger and assigned to the assignee of the present invention, a joint of the general type shown in FIG. 1 is disclosed. While the laterally opposed faces of the keyway shown in FIGS. 1 and 1a of that prior application are corrugated, the patent does not suggest or claim that these corrugations are not parallel to the keyway itself and since such corrugations are formed by the extruding die during the extrusion of the strake, they are of course, straight and uniform. In use and under test it has been found that these straight corrugations add little, if any, longitudinal shear strength to the joint.

The formation or deformation of these opposed keyway faces, preferably in a sinous wave or interrupted thread pattern is the subject matter of the present invention. While the mere use of a strong, bonding type plastic key material provides, in the structure of said patent, a joint of substantial strength in all directions including longitudinal shear, the present invention greatly increases this longitudinal shear strength, an important factor in Transit vehicles of the type for which this joint is intended.

SUMMARY OF THE INVENTION

The invention comprises an improvement in a plastic key joint for joining the edges of two edgewise adjacent panel members having adjoining edge portions thereof inter-engaged to define a closed keyway passage therebetween. Flowable, hardenable, plastic key material is injected under selected pressure into such keyway, and upon hardening forms a key securely joining the two panel members together. The improvement of the present invention greatly strengthens such joint in resistance to longitudinal shear stresses, and comprises deforming the two laterally opposite sides of such keyway in sine wave or an interrupted thread pattern, preferably by means of a die applied thereto or rolled lengthwise therealong under selected, deforming pressure.

BRIEF DESCRIPTION OF THE DRAWINGS

The objectives and advantages of the present invention will be apparent from the following description and the accompanying drawings, wherein:

FIG. 1 is a fragmentary, cross-sectional view of the joint area of two extruded aluminum strakes inter-connected by a joint incorporating the present invention.

FIG. 2 is a somewhat diagrammatic view of a roller die for deforming laterally opposed sides of the keyway in accordance with the invention.

FIG. 3 is an enlarged, developed view of the periphery of the upper roller of FIG. 2.

FIGS. 4 and 5 are isometric, sectional views showing, respectively, the left and right hand strake portions of FIG. 1 in laterally separated condition.

FIG. 6 is a diagrammatic, fragmentary, perspective view of a modified form of the invention employing an interrupted straight thread pattern.

DETAILED DESCRIPTION OF THE INVENTION

Referring to the drawings in detail, two strakes A and B may be adjoining, horizontally extending, edgewise upright strakes covering a portion of a sidewall of a transit vehicle below the usual row of windows in such sidewall. While this invention is particularly useful for joining the strakes of the sidewalls of transit vehicles such as buses and rail cars, the term "strakes" as used herein is intended to mean "panel-like members" in general.

The strakes A and B comprise outer plate portions 10 and 11, respectively, and each strake is provided with a selected plurality of integral, inwardly extending support flanges 12 and 13, see FIG. 1. Inner edge portions 14 and 15 of these support flanges are bent at right angles, and are secured by suitable fasteners, such as usual rivets 17, to upright mullions 18 which are provided between adjacent windows of the vehicle in which the invention is incorporated.

Inter-engaging edge portions of the two strakes A and B comprise an angle flange 19 which extends laterally outwardly from an intermediate portion of the support flange 12 of the strake A to define, with the support flange 12 and the edge of outer plate portion 10, an outwardly open channel 20 of a width to receive therein an inwardly extending flange 21 formed along the edge of the plate portion 11 of the other strake B.

An inwardly offset first tongue 22 extends laterally outwardly from the flange 21 and fits into a groove 23 provided in a thickened portion at the base of support flange 12, while a second tongue 24 extends laterally outwardly along the free edge of the angle flange 19 and fits into a groove between the plate portion 11 and a short flange 25 formed integrally with the support flange 13.

The strakes A and B extend lengthwise of the vehicle upon which they are mounted, preferably with the first strake A lowermost and secured to the mullions 18 prior to the application of the strake B. Then, when the strake B is applied with the flange position in the channel 20, and released, gravity urges the upper strake B downwardly toward interlocked position as shown in FIG. 1, forcing the tongue 22 into its groove 23, and the tongue 24 inserted beneath the short flange 25. Such downward movement of the upper strake B to its final interlocked position also laterally expands a fully enclosed and substantially sealed keyway 27, see FIG. 1, into which a quantity of flowable, hardenable, plastic material 28 is forced, preferably under substantial pressure, so as to fill the keyway or a desired portion thereof. Introduction of the pressurized plastic material into the keyway 27 urges apart the laterally opposite sides 29 and 30 of the keyway 27, thereby urging the strakes A and B edgewise toward each other, and the tongues 22 and 24 more fully into their respective grooves.

This basic type of joint is extremely strong with respect to stresses in all directions. However, in order to increase the strength of the joint with respect to longitudinal shear stresses in accordance with the present invention, the portions of the strakes defining the laterally opposite sidewalls 29 and 30 of the keyway 27 are deformed in a manner which greatly strengthens the joint against relative longitudinal slippage of the strakes A and B.

A presently preferred method for deforming these opposed side walls is by means of a die, preferably in the form of a roller 31, see FIG. 2, having a sinuous, screw-thread-like pattern 32 extending around the periphery thereof. This die 31, when rolled under selected, deforming pressure along the lateral sidewalls 29 and 30 of the keyway, produces a sinuous screw thread pattern in such sidewalls as shown by the developed form of such pattern 32a shown in FIG. 3. When the key material 28 is injected under selected pressure to fill all or a desired portion of the keyway, it fills the patterns of the opposed keyway and wall surfaces and thereby strongly resists longitudinal slippage of the strakes A and B relative to the hardened plastic key 28 and to each other.

Among other patterns suitable for deforming the sidewalls of the keyway 27 in accordance with the present invention are the undulating wave pattern shown at 33 in FIGS. 4 and 5, and the mutilated thread pattern 34 shown in FIG. 6.

OPERATION OF THE INVENTION

Referring first to the sine wave modified screw thread pattern shown in FIGS. 1–3, after the two strakes A and B have been moved together to their interlocked position shown in FIG. 1 and described previously herein, a required quantity of plastic key material 28 is injected under selected pressure into the keyway 27. The pressure exerted by introduction of the pressurized key material forces the key material into the interstices of the patterns impressed into the laterally opposed passage sidewalls 29 and 30. Upon hardening of the key material it is obvious that no relative longitudinal slippage between the key material and the extrusions in contact therewith can occur without deformation or rupture of the key material itself, thus greatly strengthening the joints resistance to longitudinal stresses.

The operation of the modified forms of the invention shown in FIGS. 4–6 are similar to that described for FIGS. 1–3 and 7, and will be apparent to one having read and understood the preceding description of the operation of the form of the invention shown in FIGS. 1–3.

The invention, the practice of which requires only the deformation of the surfaces defining the laterally opposite sides of the keyway, greatly increases the strength of the joint in longitudinal shear.

Having thus described the invention, what is claimed as new and useful and desired to be secured by U.S. Letters Patent is:

1. The method of increasing the longitudinal shear strength of a plastic key joint wherein oppositely facing, relatively overlapping, straight edge portions of two edgewise adjacent extruded metal stakes, which edge portions are interfitted to define an enclosed, straight, keyway passage therebetween, and such keyway passage is filled with flowable, hardenable key material injected therein under selected pressure, the improvement which comprises:

deforming edge portions of both of said strakes which define laterally opposite sides of such keyway passage in undulating patterns extending longitudinally of such passage prior to the introduction of the key material into the keyway, whereby the flowable key material fills the undulating patterns of the keyway, and, upon hardening, strongly resists relative movement of the two strakes longitudinally of such passage.

2. The method as defined in claim 1, wherein each of the strake portions defining the laterally opposite sides of such keyway is deformed to define a sinuous wave pattern extending longitudinally substantially the entire length of its respective side of the keyway.

3. The method defined in claim 2, wherein the portions of the strakes defining such laterally opposite sides of such keyway are in the form of longitudinally extending screw threads which screw threads are deformed in a selected pattern transversely of such passage.

4. The method of increasing the longitudinal shear strength of a plastic key joint of the type wherein edge portions of two edgewise adjacent metal strakes are in relatively overlapping relation and are interfitted to define an enclosed keyway, and such keyway is filled with flowable, hardenable, key material, which material is hardened within such keyway, the improvement which comprises, prior to the joining of the two strakes, applying to the portion of each of said strakes which define one of such laterally opposite sides of such keyway, a die having a sine wave thread pattern embossed thereon under sufficient pressure to deform each such portion of each strake to indent therein such sine wave thread pattern, whereby, when the flowable key material is injected into such passage, the key material flows into the surface irregularities produced by the indenting of said each surface, and when hardened strongly resists relative longitudinal movement of the strakes.

5. The method defined in claim 4 wherein the die is a roller die with the pattern embossed on the periphery thereof, and the die is rolled under such deforming pressure lengthwise along each of such strake portions defining one of such laterally opposite sides of such keyway.

6. In a plastic key interlock joint joining in edge-to-edge relation, the straight sides of two relatively thin, straight, extruded, aluminum plate members of the type wherein, following an initial hooked engagement of the joined edges of the two plate members, movement of the plate members edgewise together completes the joint and opens up a key forming passage within the joint, which passage is then filled with flowable, hardening, key forming material, the improvement which comprises:

an embossed pattern formed in the portions of said strakes defining at least two opposed, otherwise straight sides of such passage, each of which patterns extends longitudinally of such passage, and varies in direction in selected sequence transversely of such passage, whereby relative displacement in shear of the two plate members lengthwise of such passage creates compressive forces on the key material located between such patterned side portions throughout a substantial portion of the entire length of such joint passage.

* * * * *